United States Patent [19]

Heyser

[11] 4,287,578
[45] Sep. 1, 1981

[54] METHOD FOR SHAPING AND AIMING NARROW BEAMS

[75] Inventor: Richard C. Heyser, Tujunga, Calif.

[73] Assignee: The United States of America as represented by the Administrator of the National Aeronautics and Space Administration, Washington, D.C.

[21] Appl. No.: 92,143

[22] Filed: Nov. 7, 1979

[51] Int. Cl.³ .................. G01S 15/04; G01S 15/89
[52] U.S. Cl. .................... 367/88; 367/102; 367/100
[58] Field of Search .............. 367/101, 88, 100, 102, 367/103; 343/17.2 PC

[56] References Cited

U.S. PATENT DOCUMENTS

| | | | |
|---|---|---|---|
| 3,302,162 | 1/1967 | Rowlands | 367/100 |
| 3,484,737 | 12/1969 | Walsh | 367/88 |
| 3,798,590 | 3/1974 | Jacobson et al. | 367/100 |
| 3,805,222 | 4/1974 | Pekau | 367/88 |
| 3,827,022 | 7/1974 | Booth | 367/104 |
| 3,890,618 | 6/1975 | Speiser | 367/100 |
| 3,969,725 | 7/1976 | Couvillon et al. | 343/17.2 PC |
| 4,088,978 | 5/1978 | Gilmour | 367/88 |

OTHER PUBLICATIONS

Nawar et al., "A Pulse Compression Echo Sounder for Ocean Bottom Surveys", *Journal of Geophysical Research*, Nov. 15, 1966, pp. 5279–5282.

*Primary Examiner*—Richard A. Farley
*Attorney, Agent, or Firm*—Monte F. Mott; John R. Manning; Paul F. McCaul

[57] ABSTRACT

A method and apparatus is disclosed for use of a linear frequency chirp in a transmitter/receiver (14/16) having a correlator to synthesize a narrow beamwidth pattern from otherwise broadbeam transducers when there is relative velocity between the transmitter/receiver (14/16) and the target. The chirp is so produced in a generator (20) in bandwidth, B, and time, T, as to produce a time-bandwidth product, TB, that is increased for a narrower angle. A replica of the chirp produced in a generator (26) is time delayed and Doppler shifted for use as a reference in receiver (16) for correlation of received chirps from targets. This reference is Doppler shifted to select targets preferentially, thereby to not only synthesize a narrow beam but also aim the beam in azimuth and elevation.

12 Claims, 8 Drawing Figures

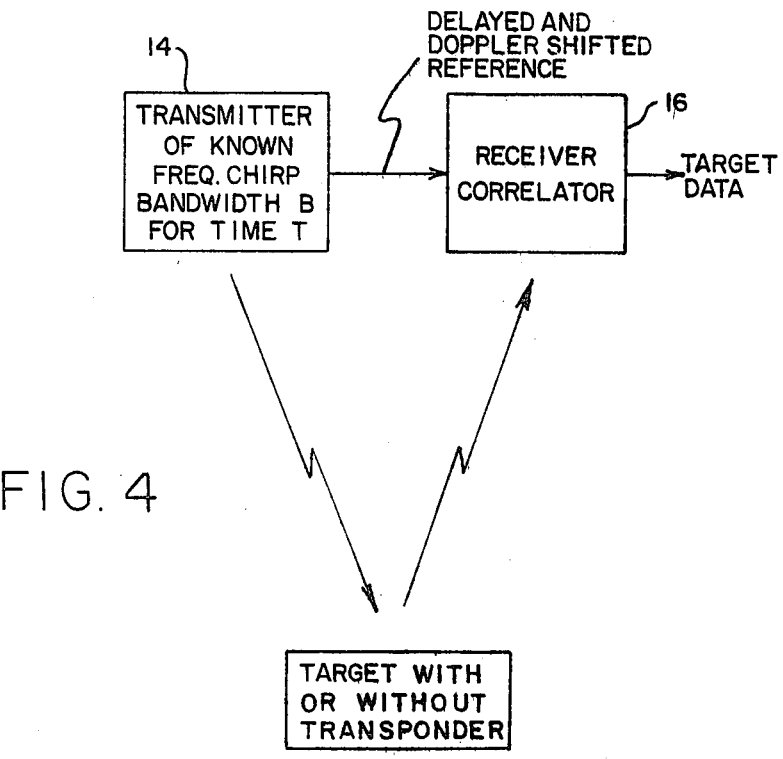
FIG. 4
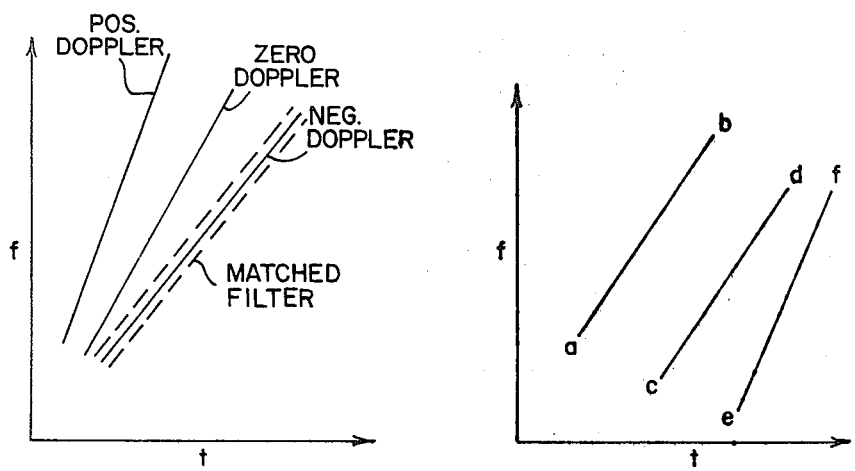
FIG. 5
FIG. 6

METHOD FOR SHAPING AND AIMING NARROW BEAMS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

TECHNICAL FIELD

This invention relates to a method and apparatus for synthesizing a narrow beamwidth pattern from otherwise broad beamwidth transducers when there is a velocity difference between the transmitter/receiver and a return source of wave energy, and for preferentially aiming the beam to select targets.

BACKGROUND ART

In ocean floor surveying and subbottom mapping with sonar for different commercial and noncommercial applications, it would be desirable to form and aim a narrow sonar beam from a submerged vessel having both a transmitter and receiver towed at some speed, such as 7 knots. It has been discovered that the Doppler effect produced in a frequency chirp may be used to advantage to aim a beam, and that control of the time-bandwidth product of the chirp can be used to form a narrow beam thereby to increase the effectiveness of sonar mapping and surveying.

Mapping is, of course, only one application of a sonar system embodying the invention. It may also be used in other applications, such as in selective target identification. For example, assume a command ship wishes to be able to determine the presence of a particular submarine in an area having many other targets in the water at about the same range. The echo returns from all the targets may make it very difficult to determine the presence of the submarine if all targets have about the same relative velocity as the submarine. If the particular submarine returns a transponder produced echo that is Doppler shifted more than expected echo returns from any other target in the water, the submarine can be easily identified by correlating the signal received from the transponder with its replica at the receiver. Still other applications will occur to those skilled in the art.

Although the invention will be first described in terms of synthesizing and aiming the narrow beam in real time, it can be readily appreciated that in practice the transmitted and received sonar signal may be recorded, such as on magnetic tape, for later processing. In the later processing, the technique to be described can be applied as though the data were being received in real time. An advantage is that the same data can be processed repeatedly, each time effectively aiming the beam in the direction of a different target. It should also be understood that the basic concept of the invention may be used with radar, since electromagnetic wave energy will respond to the same principles in respect to the Doppler effect occurring when the source and the receiver are in motion relative to each other, as with acoustical wave energy.

It will be shown that the ratio of the velocity of the relative motion to the speed of sound in water is an important factor in synthesizing a narrow sonar beam. The corresponding ratio of the relative velocity to the speed of light is likewise an important factor in synthesizing a narrow radar beam. As will be explained more fully hereinafter, the half angle of the beam decreases as that ratio increases, but since there is a practical limit in producing relative velocity that is commensurate to the speed of light, it is not generally practical to try to reduce the width of a radar beam for earth bound applications. However, spaceflight and satellite applications may produce a relative velocity that is commensurate to the speed of light to permit the present invention to be utilized. One application may be for a spaceship (or earth station) to track the position of another spaceship or satellite.

STATEMENT OF INVENTION

In accordance with the present invention, a linear frequency chirp is transmitted for a known interval and received as a Doppler shifted chirp from targets through a suitable transducer as the transmitter/receiver moves relative to the target. When the Doppler shift is due solely to motion of the transmitter/receiver, echo returns of the transmitted chirp will have a positive Doppler shift for targets in front of the transmitter/receiver, and a negative Doppler shift for targets behind the transmitter/receiver. Any one Doppler shift can be selected at the receiver by correlating a replica of the transmitted chirp that is delayed and Doppler shifted. Thus, by properly delaying and Doppler shifting the transmitted chirp for use as a replica in the receiver for correlation, the beam may be aimed in azimuth and elevation to targets selected preferentially. To form a narrow beamwidth pattern, the time-bandwidth product, TB, of the transmitted chirp is increased. An increase of one order of magnitude, such as from 1,000 to 10,000, decreases the beamwidth by one order of magnitude, such as 12.50° to 2.5°. The operation can be performed in a single sweep for real-time operation by selecting the time-bandwidth product at the time of transmitting the chirp, and selecting the time delay and Doppler shift for the chirp replica to be used in the correlation. However, having selected the beamwidth (by preselecting the time-bandwidth products for successive sweeps), and having recorded the echo returns, it is possible to preferentially aim the beam at targets in different directions at different times by performing the correlation with a replica time delayed and Doppler shifted as required on different data processing passes.

The novel features that are considered characteristic of this invention are set forth with particularity in the appended claims. The invention will best be understood from the following description when read in connection with the accompanying drawings.

BRIEF DESCRIPTION OF DRAWINGS

FIG. 4 illustrates in general terms the methodology of the present invention.

FIG. 5 graphically illustrates the technique for aiming a beam considering only Doppler shift.

FIG. 6 illustrates the technique of FIG. 5 considering both Doppler shift and time delay.

BEST MODE FOR CARRYING OUT THE INVENTION

Figure 1:
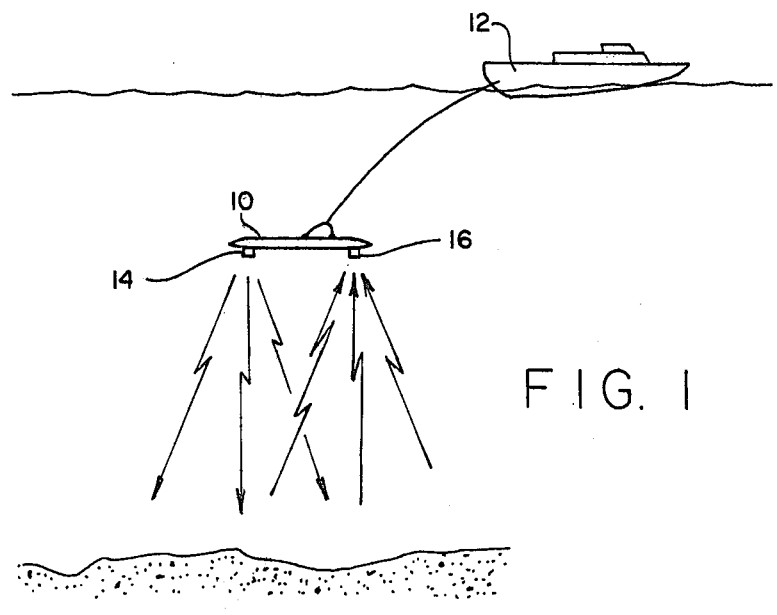
FIG. 1 illustrates a submerged vessel towing a sonar transmitter/receiver.

Referring now to the drawings, FIG. 1, illustrates a submerged vessel 10 towed by a ship 12. The vessel contains a sonar transmitter 14 and receiver 16. The transmitter/receiver apparatus is used in ocean floor surveying and subbottom mapping for scientific or commercial applications with the ship moving at about 7 knots. The sonar beam pattern is typically of the shape shown in FIG. 2, having a main lobe of 3 db half angle $\phi$, and a plurality of side lobes.

Figures 2, 3:
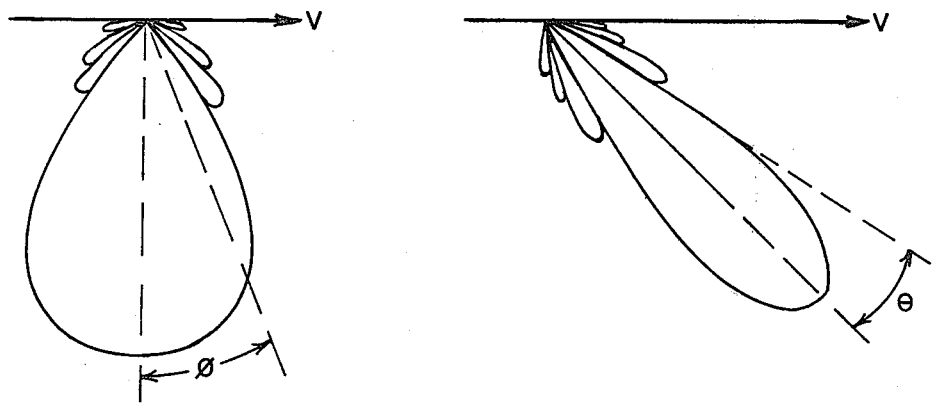
FIG. 2 shows a typical sonar beam pattern.
FIG. 3 shows the beam of FIG. 2 made narrower and aimed in accordance with the present invention.

Since the sonar vessel is moving through the water at a significant velocity, there is a substantial Doppler shift produced in the sonar echo signals received. A method and apparatus for using this Doppler effect to synthesize a narrow beam, or to aim the beam, can increase the effectiveness of the sonar surveying and mapping apparatus. FIG. 3 illustrates both aiming the beam in elevation and reducing the beamwidth angle $\theta$. As will be appreciated from the discussion that follows, either or both effects of a Doppler formed beam can be achieved as a spatial directional pattern for preferential transmission of signals based upon relative motion between the transmitter (source of signals) and the receiver (detector of sonar echos) when the transmitter and receiver are collocated, and objects in the resulting beam are at a distance.

Briefly, objects are preferentially selected in azimuth and elevation from a multiplicity of echo returning objects at the same or nearby range during each successive sweep using a correlator at the receiver for the Doppler shifted return of the selected objects, and the narrow beam is formed by control of the time-bandwidth product, TB, at the transmitter. This technique is illustrated in general terms by FIG. 4 which indicates for the transmitter 14 the general function of transmitting a known frequency chirp, i.e., a chirp of known bandwidth, B, for a specified time, T, and for the receiver the general function of correlating a time delayed replica of the transmitted chirp with the Doppler shifted return from the target.

The correlator is controlled to select the Doppler shifted return from targets in a desired direction, thereby aiming the beam in azimuth and elevation. FIG. 5 illustrates the technique graphically. Consider a chirp having a frequency, f, that varies linearly with time, t. For a target at 90° from the direction of vessel motion, the frequency of the return signal will follow a line of the same slope as the transmitted signal, indicated in the graph of FIG. 5 as ZERO DOPPLER. For a target at less than 90° from the direction of motion, the frequency of the return signal will follow a line of greater slope labeled POS. DOPPLER, and for a target at greater than 90° from the direction of motion, the frequency of the return signal will follow a line of smaller slope labeled NEG. DOPPLER. In each case, the Doppler selected is determined by the correlator using known digital data processing techniques, either on a real time basis, or off-line.

The essential process by which the correlator functions consists of the steps of multiplication of a delayed reference with the received signal, over the entire chirp interval, followed by summation of the results of multiplication. In a particular embodiment used to verify the process of Doppler beam aiming, the received signal was multiplied by the chirp signal transmitted and delayed as well as Doppler shifted. Only those received signal components having the same Doppler frequency change as that of the delayed and Doppler shifted chirp produced a multiplication product that can be characterized as a steady tone. All other Doppler shifted signals produced products characterized by a varying tone. The particular received signal, whose path delay between the transmitter and receiver was equal to the delay of the Doppler shifted chirp, produced a zero frequency (DC) signal upon multiplication with the delayed and Doppler shifted chirp. Integration of the multiplier output enhances the amplitude of the zero frequency signal, and diminishes all other signals in a manner well understood as a matched filter process. The output of this summation (integration) is the target data that may be displayed.

There are a number of different ways to implement a correlator. The foregoing technique is only one presented here by way of example, and not by way of limitation.

The foregoing discussion is general, and is easily understood by assuming for simplicity aiming in elevation only in a vertical plane passing through the vector of vessel motion as shown in FIG. 3. However, it can be readily appreciated that aiming can be extended in azimuth as well since any change in azimuth will alter the Doppler shift established by a beam at the same elevation, but at zero azimuth. However, a problem does arise in the ambiguity between a target with a negative azimuth angle and a target with a positive azimuth angle, when both have the same elevation. This ambiguity can be resolved by using a sonar that is looking only to one side. Then aiming can be carried out in azimuth and elevation without ambiguity.

To look to only one side, the sonar apparatus is installed in the vessel with a transmitter/receiver canted to one side. Synthesizing a narrow beam by controlling the time-bandwidth product of the transmitter then assures that the look is to only one side. Alternatively, arrays of transmitting and receiving transducers may be employed for electronically canting the beam as in an electronically steered radar array.

Once the cant angle is set, aiming the beam is accomplished by operation of the correlator for the desired Doppler shift. Thus by properly using the correlator, the angular position of targets in azimuth and elevation are selected preferentially from a multiplicity of targets at the same nearby range. The operation can be performed for each single sweep, and by control of the transmitted time-bandwidth product of each chirped sweep, a narrower angular selection is made than would otherwise be possible, i.e., a narrower beam is formed.

To understand the technique employed to synthesize a narrow beam, consider that the beam angle (as measured from the beam axis to the first null point of the main lobe as shown in FIG. 3) is determined by the relationship $\text{Sine } \theta = [2v(v/c)TB]^{-1}$ where v is the relative velocity between vessel and target, and c is the speed of sound in water. The ratio of velocity to speed of sound in water is multiplied by two for the round trip to produce a value proportional to the Doppler frequency shift, and the product is multiplied by the time-bandwidth product TB. The sine of the angle $\theta$ is then equal to the reciprocal of that value. Thus it can be seen that by increasing the chirp period T, or the frequency bandwidth B of the chirp, or both, the angle $\theta$ is decreased. In order to generate the narrow beam angle $\theta$, it is preferred that the original sonar angle φ be wider than θ. This is a condition contrary to the conventional sonar practice of using a narrow projected angle φ.

Now to better understand the technique of aiming the beam, consider FIG. 6, which shows the effect of simple time delay and of time delay plus Doppler shift. The presumed frequency chirp transmitted is indicated by the line a-b in the graph, and the return signal delayed by only the transit time to the target and back by a line c-d of the same slope.

The transit time delay plus Doppler shift of frequency produces a signal represented by the line e-f of a different slope. In this case, the Doppler shifted signal slope is increased, representing a target being approached by the vessel.

A correlator detects the Doppler shifted signal for the duration of the sweep interval, T. Thus, for aiming the beam, the correlator will use as a replica a presumed frequency-time slope corresponding to the Doppler direction in which maximum beam strength is desired.

If there is a frequency difference between the presumed slope and the Doppler shifted slope, the output of the correlator will diminish. In the simplest case, without time apodization, the output of the correlator will follow a (sin x)/x form, where x is a parameter related to the accumulated frequency difference for the duration of the received signal.

In a practical embodiment of this concept, a sonar projector is used with an essentially uniform sound pressure amplitude over a frequency range from 1.5 to 4.5 kHz. A transmitted chirp is used which has a slope of 10,000 Hz per second. This yields a time-bandwidth product of 900.

$$\frac{(4500 - 1500) \text{ Hz}}{10,000 \text{ Hz/sec}} (4500 - 1500) \text{ Hz} = 900 \text{ Hz-sec}$$

A Doppler shift of three Hertz during the three kilohertz sweep will yield the first null of the (sin x)/x response. This Doppler offset requires a velocity of 0.7605 meters per second.

$$\frac{2v}{c} = \frac{2v}{1521 \text{ m/sec}} = \frac{3 \text{ Hz}}{3000 \text{ Hz}}$$

v = 0.7605 meters per second.

Presuming a ship forward speed of 7 knots, or 3.6008 meters per second, a forward angle of 12.19 degrees produces the necessary 0.76 meter per second closing rate. As an example only, and not as a limitation, the transmitted chirp repeats every 4 seconds. At a speed of 7 knots the positional offset of each sonar chirp is 14.4 meters along track. The angle θ of the Doppler formed beam is approximately 10 degrees, which means that adjacent objects closer than 67 meters from the location of the transmitter/receiver will be resolved without range ambiguity.

Figure 7:
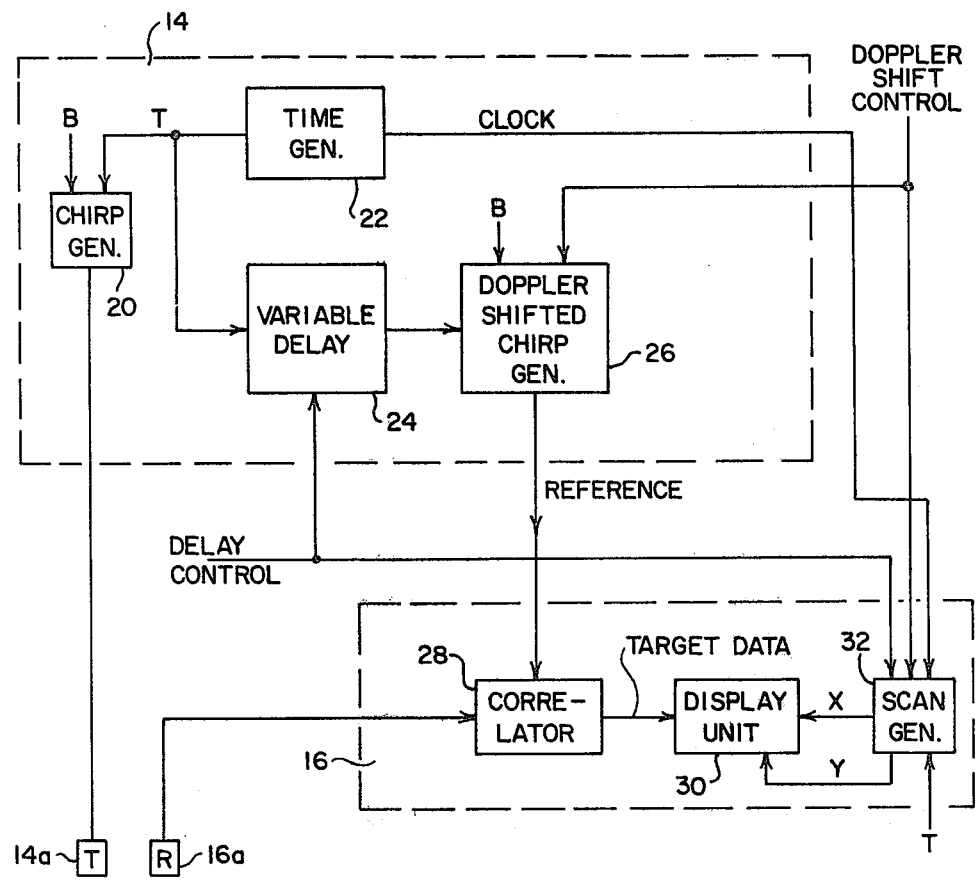
FIG. 7 illustrates a block diagram of a sonar system embodying the present invention.

Referring now to FIG. 7, a system for real time selection of targets by beam aiming is comprised of a transmitting transducer 14a driven by a frequency chirp generator 20 in the transmitter that is controlled to produce a frequency signal of selected bandwidth B for an interval T established by a timing generator 22. A variable delay 24 delays the interval T a specified time. The delayed interval T is then used to control a Doppler shifted chirp generator 26, which produces a replica of the chirp transmitted, but Doppler shifted, for use as a reference in a correlator 28.

Both chirp generators are linear sweep frequency generators with a bandwidth B either designed into the generators, or selectively set into the generators. However, the linear sweep of the chirp generator 26 is not identical to that of the chirp generator 20, except in bandwidth, since its slope and frequency offset is set by a Doppler shift control input for the particular pointing (aiming) of the beam required at the time of each sweep, or at least at the time of commencing a run of successive sweeps.

The output of the correlator is target data that may be displayed on a unit 30 as a function of range (or time). The X and Y drive for the display unit is derived from a scan generator 32. For example, assuming time is plotted on the X axis, the interval T is used to increment the starting point of each sweep on the X axis, and clock pulses occurring from one interval to the next are used to increment the Y axis in range. The delay control may be used to inhibit the Y deflection of the plot for the delay period indicated so as to plot only the range swath of interest. Since the sweeps may be in directions other than abeam, depending upon the Doppler shift control input, the slope of each sweep is modified accordingly. For example, one counter may be used to increase the X deflection one unit for each interval T to a new starting point for each sweep, and another counter is used to increase the Y deflection following the delay set in by the delay control. The outputs of the two counters are then converted from digital to analog, and multiplied by a scan converting factor introduced in the digital to analog converter. The factor is, of course, a function of the slope, and it increases from zero at the base of each sweep as a function of the Y counter. In that manner the X deflection is increased by a factor Δ(Y/S), where S is the slope determined by the Doppler shift control, and Y is the output of the Y deflection counter. For a positive Doppler shift control to aim the sonar beam at an angle less than 90° from the direction of motion, the sign of the slope S is positive, and for a negative Doppler shift control to aim the sonar beam at an angle greater than 90° from the direction of motion, the sign of the slope S is negative. Similarly, the Y deflection is increased by a factor ΔX·S, where the sign of the slope remains the same for both positive and negative Doppler shift.

Figure 8:
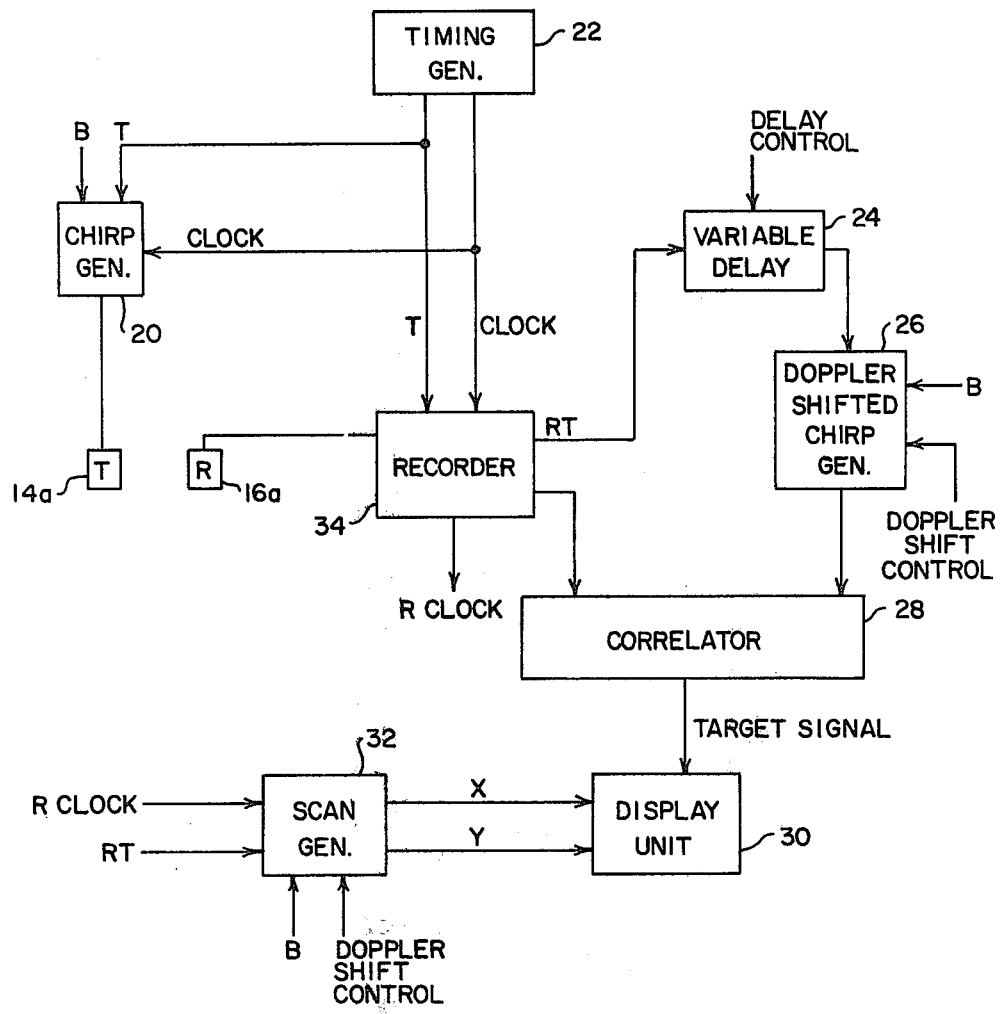
FIG. 8 illustrates a block diagram of the system of FIG. 7 for off-line data processing.

An adaptation of the system of FIG. 7 for off-line data processing is shown in FIG. 8. The only essential difference is that a recorder 34, such as a tape recorder, is used to store: the signal from the receiving transducer 16a; the interval signal T; and the clock pulses, which may be accumulated and encoded to indicate real time relative to some starting point, with each code change recorded indicating a lapse of one unit of time, such as one second. The recorded data is then played back at a later time for processing as before, i.e., as in FIG. 7. An advantage of this arrangement is that once data is recorded, it can be replayed a number of times, each time aiming the beam differently through the Doppler shift control to look at different targets.

While the process of Doppler beam forming can utilize only a single transmitted chirp for each sweep, it is readily appreciated that combined processing of a successive multiplicity of chirps may be used to increase the time-bandwidth product, and thereby narrow the beam angle θ for targets present in successive chirps. The system of FIGS. 7 and 8 are intended to include this possibility, should the need present itself. Still other modifications and equivalents may readily occur to those skilled in the art. Consequently, it is intended that the claims be interpreted to cover such modifications and equivalents.

I claim:

1. In a process for transmitting a beam of frequency chirped wave energy, and for both receiving chirped wave energy from targets having relative motion and for correlating time delayed chirped wave energy with received chirped wave energy, a method of synthesizing a narrow beam from otherwise broadbeam wave energy by so controlling the frequency bandwidth, B, and the time, T, of transmitted chirps that for a narrower beamwidth under given conditions the time-bandwidth product, TB, is increased, and producing time delayed replicas of transmitted chirps for correlation with received chirps.

2. In a process as defined in claim 1, a method of preferentially selecting targets by so Doppler shifting said time delayed replica chirps as to approximately match Doppler shifted chirps returned by the targets.

3. In a process as defined in claim 2, the method of preferentially selecting targets, wherein Doppler shifted chirps correlated are transmitted chirps reflected by targets.

4. In a process as defined in claim 2, the method of preferentially selecting a target, wherein said target transponds by transmitting frequency chirped wave energy of controlled time-bandwidth product equal to that of said transmitted chirps, but with a distinct synthesized Doppler shift, and wherein Doppler shifted chirps correlated are chirps transponded by said target whereby said particular target may be preferentially selected by producing a reference signal for correlation with approximately the same distinct Doppler shift.

5. In a process as defined in claim 1, 2, 3 or 4, the method or methods described wherein said system is a sonar system, and said wave energy is comprised of sound waves transmitted through water.

6. Apparatus for transmitting to, and receiving from, targets having relative motion, a beam pattern of frequency chirped wave energy using relatively broadbeamwidth transmitting and receiving transducers, said apparatus comprising means responsive to control signals for controlling the frequency bandwidth, B, and the time interval, T, during which each chirp of wave energy is transmitted, thereby to synthesize a narrower beamwidth than is transmitted and received by so controlling the bandwidth and the time that under given conditions the time-bandwidth product, TB, in chirped wave energy transmitted is increased, means for producing a delayed and Doppler shifted replica of the transmitted chirped wave energy for use as a reference, means for correlating chirped wave energy received with said replica to produce target data, thereby synthesizing a narrower beamwidth wave energy pattern than the pattern of said transducers, and means for displaying target data.

7. Apparatus as defined in claim 6 wherein said means for producing said delayed and Doppler shifted replica includes a control for providing a selected Doppler shift thereby to preferentially select targets for display from a multiplicity of targets in different directions.

8. Apparatus as defined in claim 7 wherein said means for generating a delayed and Doppler shifted replica of the transmitted chirped energy wave is comprised of a chirp generator responsive to said control signals, and means for storing at least said time interval for use in said means for generating a delayed and Doppler shifted replica and storing received chirped wave energy for later correlation and display, said means for generating a delayed and Doppler shifted replica being responsive to control signals for controlling the frequency bandwidth and Doppler shift thereby to preferentially select a target for display at a later time.

9. Apparatus as defined in claim 6, 7 or 8 wherein said apparatus is a sonar system and said wave energy consists of sound waves transmitted through water.

10. Apparatus for locating targets with transmitted waves of energy using collocated broadbeam transmitting and receiving transducers, where said energy is transmitted as a linear frequency chirp of predetermined bandwidth, B, for a controlled interval, T, thereby to control the time-bandwidth product of transmitted energy for a beam of narrow width, comprising means for correlating waves of energy from targets with a time delayed replica of said energy transmitted, said received waves of energy also being linear frequency chirps of the same time-bandwidth product as transmitted chirps, and means for generating said replica with a predetermined Doppler shift, thereby to preferentially select a target for said beam of narrow width.

11. Apparatus as defined in claim 10 wherein said received energy is energy reflected by targets.

12. Apparatus as defined in claim 10 wherein said received energy is energy transmitted by a target.

* * * * *